United States Patent [19]

Maruyama et al.

[11] Patent Number: 5,174,328
[45] Date of Patent: Dec. 29, 1992

[54] PRESSURE CONTROL VALVE

[75] Inventors: Jun Maruyama; Masayuki Tanaami, both of Kanagawa, Japan

[73] Assignee: Kabushiki Kaisha Komatsu Seisakusho, Japan

[21] Appl. No.: 752,554

[22] PCT Filed: Mar. 16, 1990

[86] PCT No.: PCT/JP90/00358

§ 371 Date: Sep. 11, 1991

§ 102(e) Date: Sep. 11, 1991

[87] PCT Pub. No.: WO90/10811

PCT Pub. Date: Sep. 20, 1990

[30] Foreign Application Priority Data

Mar. 16, 1989 [JP] Japan .................. 1-29045

[51] Int. Cl.$^5$ ............................ G05D 16/10
[52] U.S. Cl. ..................... 137/491; 137/492.5
[58] Field of Search ............ 137/491, 489, 492.5, 137/492; 251/333

[56] References Cited

U.S. PATENT DOCUMENTS

| 2,927,737 | 3/1960 | Zeuch | 251/333 X |
| 2,969,218 | 1/1961 | Shaw | 251/333 |
| 3,620,251 | 11/1971 | Bowen | 251/333 X |
| 4,289,160 | 9/1981 | Kawasaki | 137/491 |
| 4,476,890 | 10/1984 | Kawasaki et al. | |
| 4,548,231 | 10/1985 | Schwede | 137/491 |
| 4,597,410 | 7/1986 | Wilke | 137/491 |
| 4,610,424 | 9/1986 | Koppers | 251/333 X |

FOREIGN PATENT DOCUMENTS

| 3120606 | 7/1983 | Fed. Rep. of Germany . |
| 2258579 | 8/1985 | France . |
| 51-57027 | 5/1976 | Japan . |
| 52-18430 | 11/1980 | Japan . |
| 57-198469 | 12/1982 | Japan . |
| 62-37316 | 3/1987 | Japan . |

Primary Examiner—Alan Cohan
Attorney, Agent, or Firm—Ronald P. Kananen

[57] ABSTRACT

In a pressure control valve having a valve body (1), a pilot poppet (7) is so mounted in the body (1) as to permit/prevent communication between a low-pressure relief port (12) and a back-pressure chamber (5), while moderated and stabilized in its opening operation so as to realize a steady relief flow of the valve, which flow depends on relief-flow properties of a relief poppet (4) so provided as to permit/prevent communication between: a pressure supply port (2); and a relief port (3). A piston poppet (8) is slidably mounted in the relief poppet (4) to extend to the back-pressure chamber (5). A cross-sectional area of the piston poppet (8) is larger than an opening area of a seat portion (6a) of a passage (6) in which the pilot poppet (7) is inserted. An annular opening area (defined between: a part of a surface of the passage (6), which part extends from the seat portion (6a) to the back-pressure chamber (5); and a surface of the pilot poppet (7) facing the part) gradually reduces in cross section to form a throttle area (11).

4 Claims, 4 Drawing Sheets

PRESSURE CONTROL VALVE

FIELD OF THE INVENTION

The present invention relates to a pressure control valve used as a fluid power element for controlling a pressurized fluid, and more particularly to one provided with a pilot poppet therein.

BACKGROUND OF THE INVENTION

Hitherto, it is known that, for example as shown in FIG. 1, in a pressure control valve of a conventional type: a relief poppet c functions to permit and prevent communication between a pressure supply port "a" and a relief port b; a sleeve-like piston poppet e is slidably mounted in the relief poppet c, and extends to pass through the same c so as to permit communication between the pressure supply port "a" and a back-pressure chamber d; a pilot poppet g functions to open and close a passage between the back-pressure chamber d and a low-pressure relief port f, a ratio of which passage to the piston poppet c in cross section, i.e., a cross-sectional area $A_P$ of the passage to that $A_R$ of the piston poppet e is a value of $A_P/A_R$ which is so determined as to be greater than or equal to 1.1, whereby the pressure control valve is improved in transient properties of operation (See Japanese Patent Publication No. Sho 62-29665). In the conventional pressure control valve having the above construction, a pressure of pressurized oil existing in the relief port f is low when the pilot poppet g begins to open. In contrast with this, a pressure of pressurized oil existing in the relief port b is very high when the relief poppet c begins to open. Consequently, a difference in pressure between the pressurized oil in the low-pressure relief port f and that in the relief port b is very large in the conventional pressure control valve (See FIG. 2).

Namely, in operation, the transient properties of the conventional pressure control valve depends on relief-flow properties of the pilot poppet g instead of relief-flow properties of the relief poppet c until a pressure of the pressurized oil existing in the pressure supply port "a" increases to an eventual value at which the relief poppet c begins to open, which pressure increases first to a value at which the pilot poppet g begins to open. Consequently, in the above transient period of time in operation, the pressurized oil flows to a drain side of the pressure control valve. This flow of the pressurized oil is not advantageous from the standpoint of energy saving.

In other words, in operation of a hydraulic system, since control of a hydraulic actuator of the system depends on relief-flow properties of the relief poppet c of the pressure control valve in the system, such control of the actuator depends on relief-flow properties of the pilot poppet g of the pressure control valve until the relief poppet c of the pressure control valve is opened. Consequently, relief-flow properties of the conventional pressure control valve are shown in FIG. 2.

As is clear from the relief-flow properties shown in FIG. 2, in the conventional pressure control valve having the above construction, a difference in pressure between: a pressure with which the pilot poppet g is opened; and a pressure with which the relief poppet c is opened becomes large in the transient period of operation. In addition, during such transient period of operation, motion of the pilot poppet g in the pressure control valve becomes unstable and tends to cause chattering.

SUMMARY OF THE INVENTION

In view of the above circumstances, the present invention was made. Consequently, it is an object of the present invention to provide a pressure control valve which, in transient period of operation, reduces a difference in pressure between: a pressure with which a pilot poppet of the valve is opened; and a pressure with which a relief poppet of the valve is opened, and in which valve the pilot poppet is moderated and stabilized in motion so as to prevent the valve from chattering.

According to a first aspect of the present invention, the above object of the present invention is accomplished by providing:

In a pressure control valve provided with a valve body, comprising:

a relief poppet for permitting and preventing communication between: a pressure supply port formed in one of opposite end portions of the valve body; and a relief port formed in an intermediate portion of the valve body, the relief poppet being slidably mounted in the valve body;

a sleeve-like piston poppet for permitting communication between: a back-pressure chamber formed in the valve body; and the pressure supply port, the sleeve-like piston poppet being slidably mounted in the relief poppet; and a pilot poppet movably inserted in a passage formed in the valve body in a downstream side of the back-pressure chamber, the pilot poppet being separated from a seat portion of the passage to permit communication between: the back-pressure chamber; and a low-pressure supply port (formed in the other of the oppsite end portions of the valve body) when pressurized fluid in the back-pressure chamber increases in pressure to a value greater than or equal to a predetermined pressure, the improvement wherein:

a large-diameter portion of the piston poppet is larger in cross-sectional area than an area of an aperture defined by the seat portion of the passage formed in the valve body; and an annular opening area is defined between: an inner peripheral surface of the passage, which inner peripheral surface extends from the seat portion of the passage toward the back-pressure chamber; and an outer peripheral surface of the pilot poppet, which outer peripheral surface is oppositely disposed in a diametrical direction from the inner peripheral surface of the passage so as to face the same, the annular opening area gradually reducing its cross-sectional area toward the seat portion of the passage to form a throttle portion for restricting the flow of the pressurized fluid passing through the passage.

According to a second aspect of the present invention, the above object of the present invention is accomplished by providing:

The pressure control valve as set forth in the first aspect of the present invention, wherein:

the outer peripheral surface of the pilot poppet forms a smooth outer conical surface; and the inner peripheral surface of the passage forms a smooth inner conical surface with which the smooth outer conical surface of the pilot poppet is encircled to define the annular opening area.

According to a third aspect of the present invention, the above object of the present invention is accomplished by providing:

The pressure control valve as set forth in the first aspect of the present invention, wherein:

the outer peripheral surface of the pilot poppet forms a smooth outer conical surface; and the inner peripheral surface of the passage forms a smoothly curved convex inner surface with which the smooth outer conical surface of the pilot poppet is encircled to define the annular opening area, the smoothly curved convex inner surface of the passage being so shaped as to be brought into a line-contact with the smooth outer conical surface of the pilot poppet.

According to a fourth aspect of the present invention, the above object of the present invention is accomplished by providing:

The pressure control valve as set forth in the first aspect of the present invention, wherein:

the outer peripheral surface of the pilot poppet forms a convex outer surface provided with a radially extending annular edge portion having a predetermined lip angle; and the inner peripheral surface of the passage forms a smooth inner conical surface with which the convex outer surface of the pilot poppet is encircled to define the annular opening area.

In the pressure control valve of the present invention having the above construction, since the cross-sectional area of the piston poppet is larger than the opening area defined by the seat portion of the passage, it is possible to reduce a difference between: a pressure of pressurized fluid, with which pressure the pilot poppet is opened; and a pressure of pressurized fluid, with which pressure the relief poppet is opened.

Consequently, in operation, the relief poppet is opened immediately after the pilot poppet is opened, so that a transient period of time for which motion of the valve depends on flow properties of the pilot poppet is reduced, whereby relief-flow properties of the valve substantially depends on flow properties of the relief poppet.

In operation of the pressure control valve of the present invention, since a pressure of pressurized fluid (which passes through the annular opening area defined between the conical outer peripheral surface of the pilot poppet and the inner peripheral surface of the passage) varies steadily through the throttle area of the annular opening area, it is possible for the valve to move the pilot poppet moderately, which prevents: the valve from chattering; and a flow rate of the pressurized fluid from varying intermittently in operation.

Consequently, it is possible for the pressure control valve of the present invention to stabilize its transient operation even when the cross-sectional area of the piston poppet is larger than the opening area defined by the seat portion of the passage of the valve.

The above object, additional objects, additional embodiments and advantages of the present invention will be clarified to those skilled in the art hereinbelow with reference to the following description and accompanying drawings illustrating preferred embodiments of the present invention according to principles of the invention.

DESCRIPTION OF THE PREFERRED EMBODIMENTS

Hereinbelow, an embodiment of the present invention will be described in detail with reference to the accompanying drawings (FIGS. 3 to 9).

Figure 1:
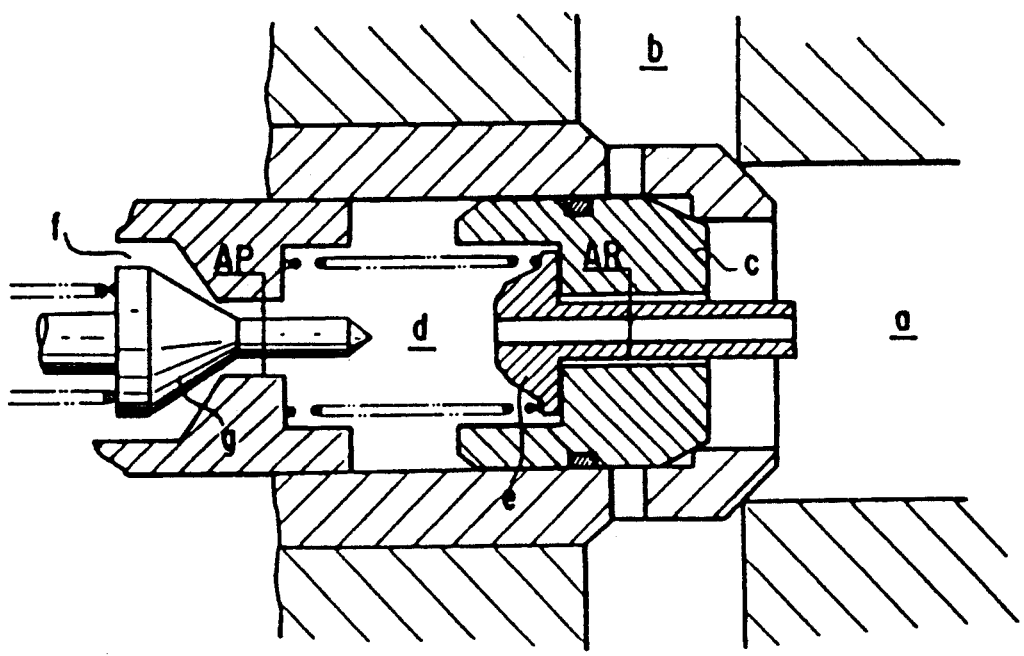
FIG. 1 is a longitudinal sectional view of an essential part of the conventional pressure control valve.
Figure 2:
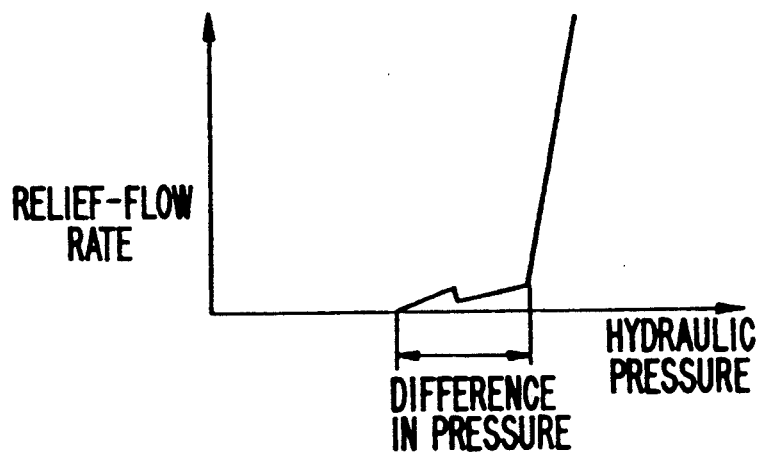
FIG. 2 is a diagram illustrating relief-flow properties of the conventional pressure control valve shown in FIG. 1.
Figure 3:
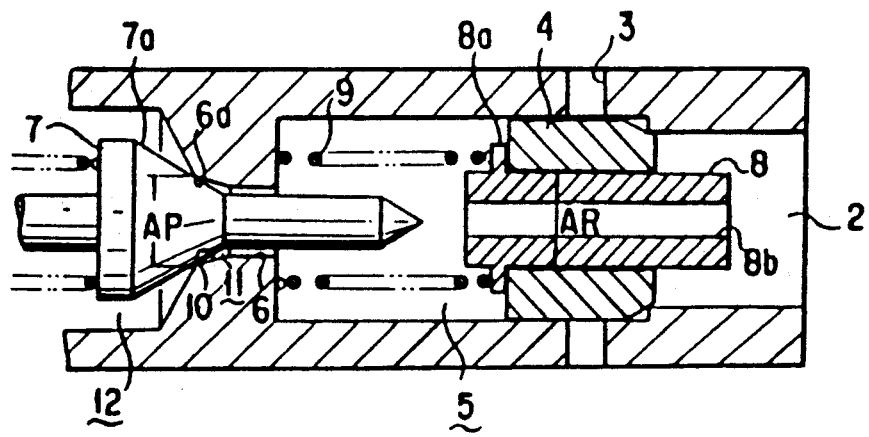
FIG. 3 is a longitudinal sectional view of an essential part of an embodiment of a pressure control valve of the present invention.

As shown in FIG. 3, a preferred embodiment of a pressure control valve of the present invention is provided with a valve body 1 in which is slidably mounted a relief poppet 4 for permitting and preventing communication between a pressure supply port 2 and a relief port 3. A back-pressure chamber 5 is formed in the valve body 1, and communicates with a low-pressure relief port 12 by means of a passage 6 which is opened and closed by a pilot poppet 7 slidably mounted in the valve body 1. Further, a sleeve-like piston poppet 8 is substantially coaxially and slidably mounted in the relief poppet 4 so as to pass through the same, to make it possible that the pressure supply port 2 communicates with the back-pressure chamber 5 through a through-hole 8b of the piston poppet 8. As viewed in FIG. 3, the piston poppet 8 is constantly urged rightward under the influence of a resilient force exerted by a compression coil spring 9, so that the relief poppet 4 is also constantly urged rightward under the influence of the above resilient force so as to be positioned in its shut-off position (shown in FIG. 3) in which position the poppet 4 closes a relief port 3 of the valve. Namely, since the piston poppet 8 is provided with a flange portion 8a and has the same 8a abut on a left end of the relief poppet 4, the poppet 4 is resiliently held in its shut-off position. In the embodiment of the pressure control valve of the present invention shown in FIG. 3, a cross-sectional area $A_R$ of the piston poppet 8 is larger than an opening area $A_P$ defined by a seat portion 6a of the passage 6.

On the other hand, as shown in FIG. 3, a funnel-shaped orifice portion 10 having a conical inner peripheral surface is formed in the passage 6 so as to extend from a substantially intermediate portion of the passage 6 to the seat portion 6a of the same 6. Further, an annular opening area is defined between: an inner peripheral surface of the passage 6, which inner peripheral surface extends from the seat portion 6a of the passage 6 toward the back-pressure chamber 5; and a conical outer peripheral surface 7a of the pilot poppet 7, which outer peripheral surface 7a is oppositely disposed in a diametrical direction from the inner peripheral surface of the passage 6 so as to face the same 6, the annular opening area gradually reducing its cross-sectional area toward the seat portion 6a of the passage 6 to form a throttle portion 11 for restricting the flow of the pressurized fluid passing through the passage 6.

Since the pressure control valve of the present invention has the above construction, in operation, when a pressure of pressurized fluid in the back-pressure chamber 5 increases to push the pilot poppet 7 leftward as viewed in FIG. 3 so that the passage 6 is opened, the pressurized fluid or oil in the pressure supply port 2 begins to flow into the low-pressure relief port 12. As a result, a difference in pressure develops between: the pressurized oil existing in the pressure supply port 2; and the pressurized oil existing in the back-pressure chamber 5, so that the piston poppet 8 is moved leftward as viewed in FIG. 3 against a resilient force exerted by a compression coil spring 9. As a result, a left-end opening of the through-hole 8b of the piston poppet 8 is closed by a right-end portion of the pilot poppet 7 to shut off the pressurized oil flow passing through the through-hole 8b of the piston poppet 8. Consequently, the pressurized oil in the pressure supply port 2 begins to flow into the back-pressure chamber 5 through a clearance between the relief poppet 4 and the piston poppet 8 to develop a large difference in pressure between the pressure supply port 2 and the back-pressure chamber 5, so that the relief poppet 4 is moved leftward as viewed in FIG. 3 to permit communication between the pressure supply port 2 and the relief port 3, whereby the pressurized oil in the pressure supply port 2 is released into the relief port 3.

In the above operation, since the cross-sectional area $A_R$ of the piston poppet 8 is larger than the opening area $A_P$ defined by the seat portion 6a of the passage 6, a pressure of pressurized oil (hereinafter referred to as the relief poppet opening pressure) with which the relief poppet 4 is opened is slightly larger than a pressure of pressurized oil (hereinafter referred to as the pilot poppet opening pressure) with which the pilot poppet 7 is opened. Consequently, a difference in pressure between the relief poppet opening pressure and the pilot poppet opening pressure is small.

Namely, in operation, since an area of the piston poppet 8 subjected to the difference in pressure of pressurized oil becomes larger, the piston poppet 8 is moved leftward even when the difference in pressure of pressurized oil is small. Consequently, the relief poppet 4 is opened immediately after the pilot poppet 7 is opened.

Figure 4:
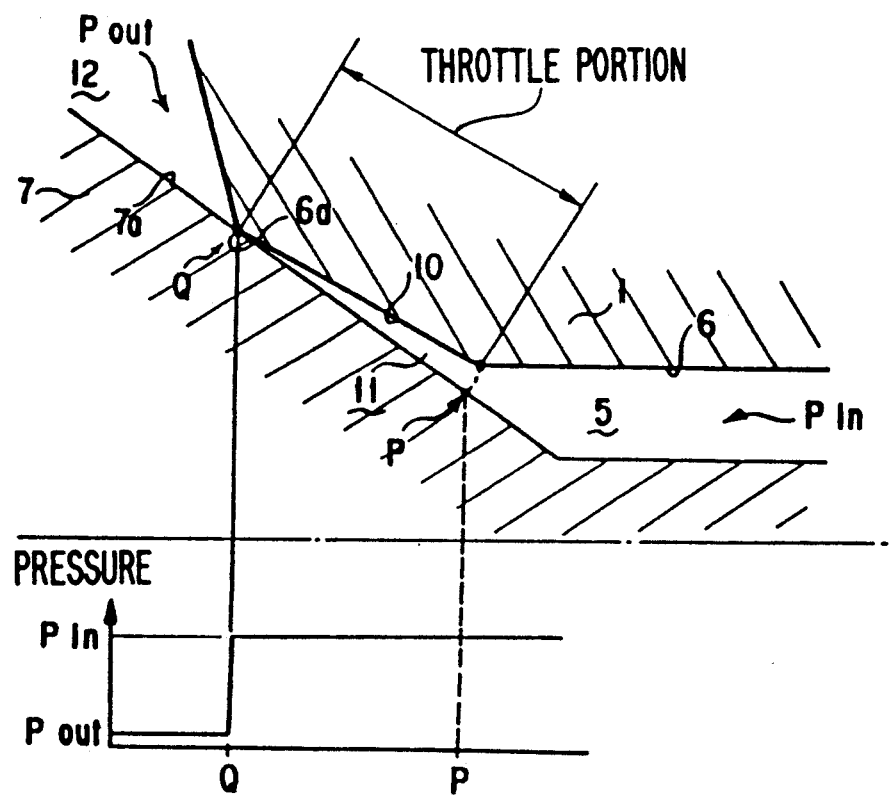
FIG. 4 is an enlarged longitudinal sectional view of an essential part of the embodiment of the present invention shown in FIG. 3, illustrating a difference in pressure of pressurized fluid in the throttle portion of the annular opening area of the valve when the pilot poppet is seated on the seat portion of the passage.
Figure 5:
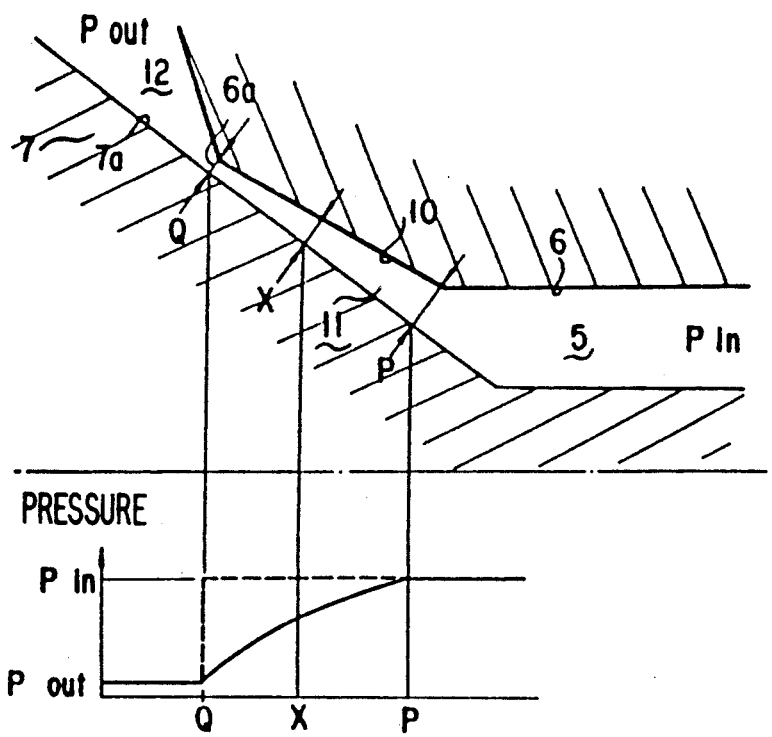
FIG. 5 is an enlarged longitudinal sectional view of an essential part of the embodiment of the present invention shown in FIG. 3, illustrating a difference in pressure of pressurized fluid in the throttle portion of the annular opening area of the valve when the pilot poppet is separated from the seat portion of the passage.

Further, in the pressure control valve of the present invention, since the throttle portion 11 is formed between the pilot poppet 7 and the passage 6, variation in pressure of pressurized oil in the pressure control valve is shown in FIG. 4 when the conical outer peripheral surface 7a of the pilot poppet 7 is brought into contact in a contact line Q with the seat portion 6a of the passage 6. Namely, as is clear from FIG. 4, a pressure of pressurized oil in an area extending rightward from the contact line Q (i.e., pressure in the back-pressure chamber 5) becomes a large pressure $P_{in}$, while that in an area extending leftward from the contact line Q (i.e., pressure in the low-pressure relief port 12) becomes a small pressure $P_{out}$. In operation, when the conical outer peripheral surface 7a of the pilot poppet 7 is separated in a contact line Q from the seat portion 6a of the passage 6, the pressurized fluid or oil in the back-pressure chamber 5 begins to flow into the low-pressure port 12 through the throttle portion 11 of the passage 6, so that variation in pressure of the pressurized oil becomes one shown in FIG. 5 in which pressure of the pressurized oil in the pressure control valve of the present invention smoothly decreases from the large pressure $P_{in}$ to the small pressure $P_{out}$ due to the presence of the throttle portion 11 of the passage 6.

As described above, in case that the pressure control valve is provided with the throttle portion 11 in the passage 6, a pressure of pressurized oil existing in the annular opening area (which is defined between: a plane (Q) perpendicular to the conical outer peripheral surface in the contact line Q; and a plane (P) perpendicular to the conical outer peripheral surface in a line P extending circumferential direction of the pilot poppet 7) decreases as the pilot poppet 7 opens. Consequently, a pressure of pressurized oil acting on the pilot poppet 7 so as to move the same also decreases to prevent the pilot poppet 7 from being violently moved, so that the pilot poppet 7 is stabilized in motion to prevent the valve from chattering.

Figure 6:
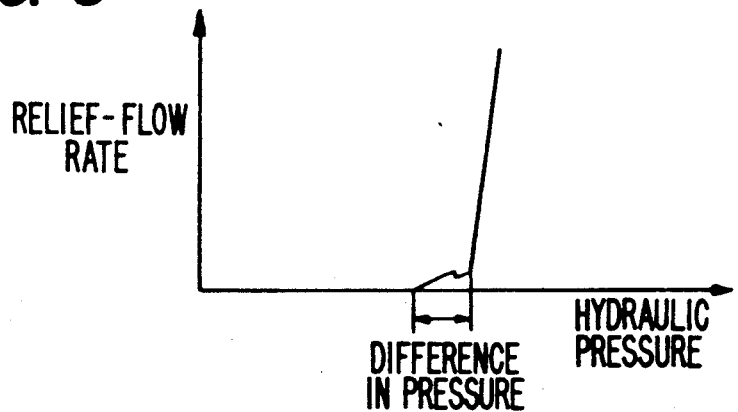
FIG. 6 is a diagram illustrating relief-flow properties of the embodiment of the pressure control valve of the present invention shown in FIG. 3.

In other words, in the pressure control valve of the present invention, since the throttle portion 11 of the passage 6 functions to smooth variation in pressure of the pressurized oil in the annular opening area (which is defined between: the conical outer peripheral surface 7a of the pilot poppet 7; and the inner peripheral surface of the passage 6) when the pilot poppet 7 is moved under the influence of the large pressure $P_{in}$ of pressurized oil varying in the back-pressure chamber 5, it is possible for the pressure control valve of the present invention to obtain relief-flow properties shown in FIG. 6. Consequently, in the pressure control valve of the present invention, as described above, since the difference between the pilot poppet (7) opening pressure and the relief poppet (4) opening pressure is small, it is possible for the valve to moderate motion of the pilot poppet 7, so that the valve is prevented from chattering, whereby a steady operation of the valve is ensured.

Figure 7:
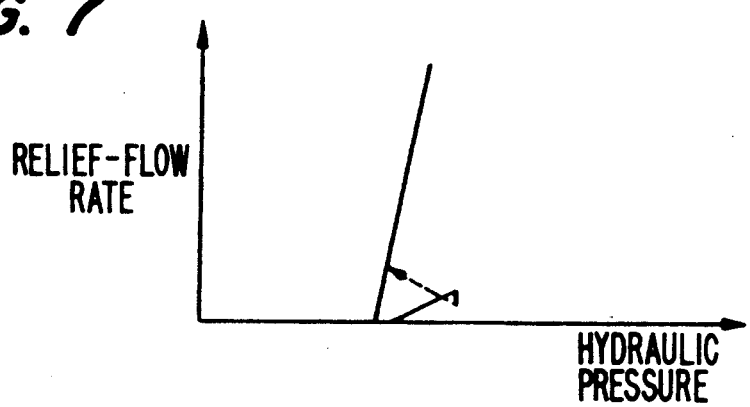
FIG. 7 is a diagram illustrating relief-flow properties of a comparative example of the pressure control valve.

As a comparative example, relief-flow properties of a pressure control valve provided with no throttle portion 11 (hereinafter referred to as the comparative valve) are shown in FIG. 7. The remaining construction of the comparative valve is the same as that of the pressure control valve of the present invention. As is clear from the comparative example shown in FIG. 7, it is impossible for the comparative valve to keep variation in relief flow of pressurized oil steady, since a pressure of pressurized oil in the pressure supply port 2 with which pressure the relief poppet 4 is held in its relief condition becomes smaller than a pressure of pressurized oil in the pressure supply port 2 with which pressure the left end opening of the piston poppet 8 is brought into contact with a right end portion of the pilot poppet 7.

Figure 8:
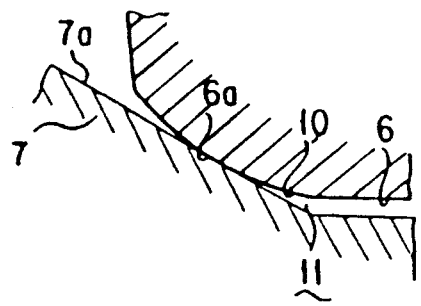
FIG. 8 is an enlarged longitudinal sectional view of an essential part of a first modification of the embodiment of the present invention shown in FIG. 3.
Figure 9:
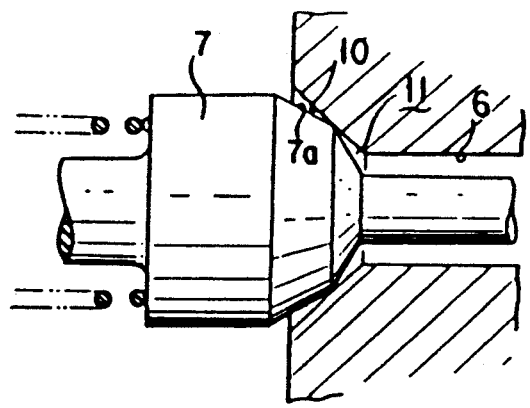
FIG. 9 is an enlarged longitudinal sectional view of an essential part of a second modification of the embodiment of the present invention shown in FIG. 3.

Incidentally, as shown in FIG. 8, it is possible to modify the seat portion 6a (which forms an edge having a predetermined lip angle) of the passage 6 in shape so as to assume a smoothly curved convex form brought into a line-contact with the conical outer peripheral surface 7a of the pilot poppet 7. Further, as shown in FIG. 9, it is also possible to modify the pilot poppet 7 (which is provided with a smooth conical outer peripheral surface) in shape so as to assume an edged convex form having a predetermined lip angle, an outer peripheral surface of which edged convex form is oppositely disposed in a diametrical direction from the smooth conical inner peripheral surface 10 of the passage 6 so as to define the throttle portion 11 therebetween.

We claim:

1. In a pressure control valve provided with a valve body, comprising:
    a relief poppet for permitting and preventing communication between: a pressure supply port formed in one of opposite end portions of said valve body; and a relief port formed in an intermediate portion of said valve body, said relief poppet being slidably mounted in said valve body;
    a sleeve-like piston poppet for permitting communication between: a back-pressure chamber formed in said valve body; and said pressure supply port, said sleeve-like piston poppet being slidably mounted in said relief poppet; and
    a pilot poppet movably inserted in a passage formed in said valve body in a downstream side of said back-pressure chamber, said pilot poppet being separated from a seat portion of said passage to permit communication between: said back-pressure chamber; and a low-pressure supply port (formed in the other of said opposite end portions of said valve body) when pressurized fluid in said back-pressure chamber increases in pressure to a valve greater than or equal to a predetermined pressure, the improvement wherein:
    a large-diameter portion of said piston poppet is larger in cross-sectional area than an area of an aperture defined by said seat portion of said passage formed in said valve body; and
    an annular opening area is defined between: a conical inner peripheral surface of said passage, which conical inner peripheral surface extends from said seat portion of said passage toward said back-pressure chamber, said conical surface decreasing in diameter from said seat portion toward said back-pressure chamber; and an outer peripheral surface of said pilot poppet, which outer peripheral surface is oppositely disposed in a diametrical direction from said conical inner peripheral surface of said passage so as to face the same, said annular opening area gradually reducing its cross-sectional area toward said seat portion of said passage to form a throttle portion for restricting the flow of said pressurized fluid passing through said passage.

2. The pressure control valve as set forth in claim 1, wherein:
    said outer peripheral surface of said pilot poppet forms a smooth outer conical surface; and
    said conical inner peripheral surface of said passage encircles said smooth outer conical surface of said pilot poppet to define said annular opening area.

3. The pressure control valve as set forth in claim 1, wherein:
    said outer peripheral surface of said pilot poppet forms a smooth outer conical surface; and
    said conical inner peripheral surface of said passage forms a smoothly curved convex inner surface with which said smooth outer conical surface of said pilot poppet is encircled to define said annular opening area, said smoothly curved convex inner surface of said passage being so shaped as to be brought into a line-contact with said smooth outer conical surface of said pilot poppet.

4. The pressure control valve as set forth in claim 1, wherein:
    said outer peripheral surface of said pilot poppet forms a convex outer surface provided with a radially extending annular edge portion having a predetermined lip angle; and
    said inner conical peripheral surface of said passage encircles said convex outer surface of said pilot poppet to define said annular opening area.

* * * * *